Feb. 9, 1965 C. N. CHANDLER ETAL 3,168,959
CARGO TRANSPORTING SYSTEM
Filed Sept. 26, 1962 5 Sheets-Sheet 1
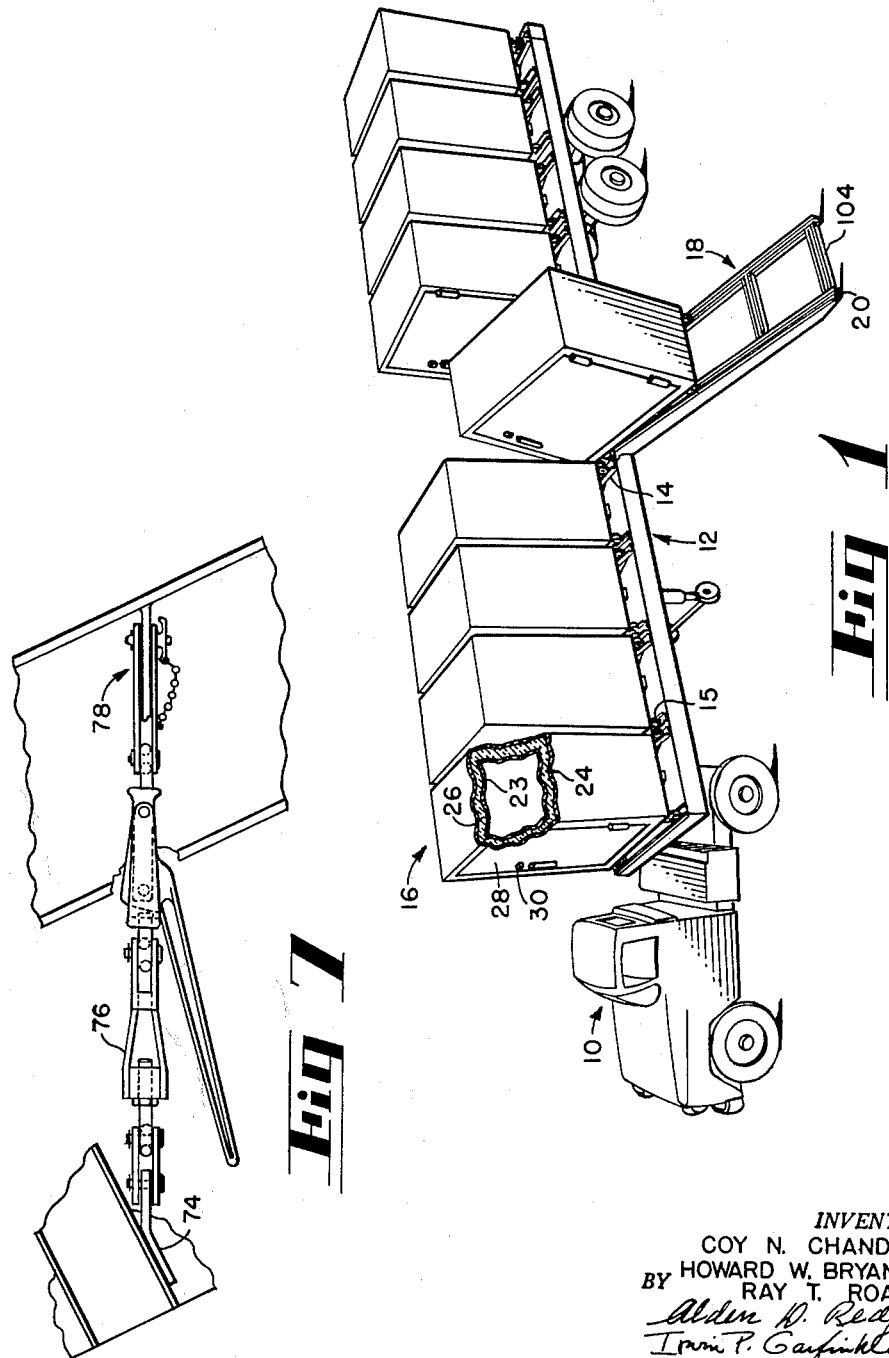
INVENTORS.
COY N. CHANDLER
HOWARD W. BRYAN, JR.
BY RAY T. ROACH
ATTORNEYS.

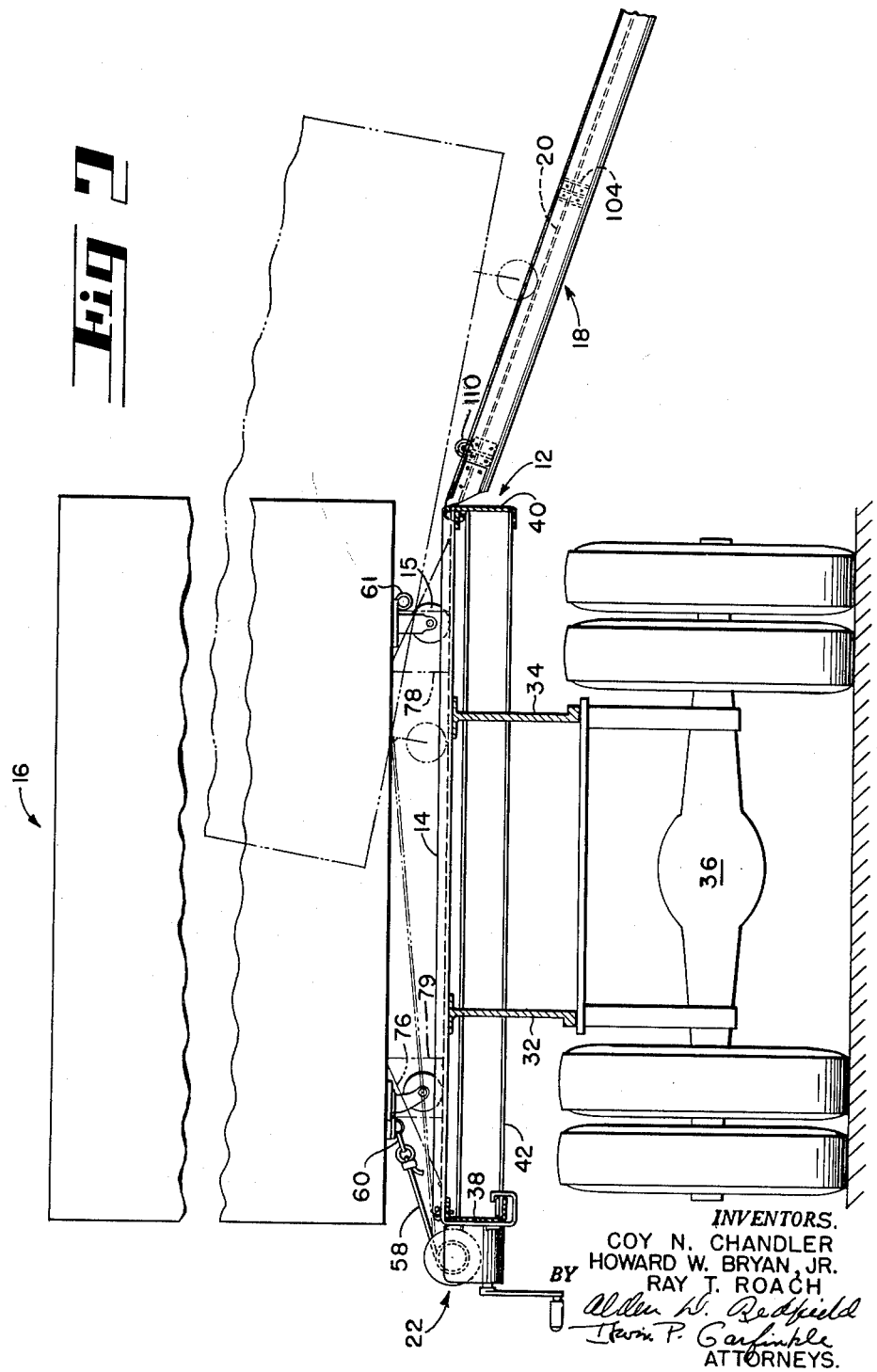

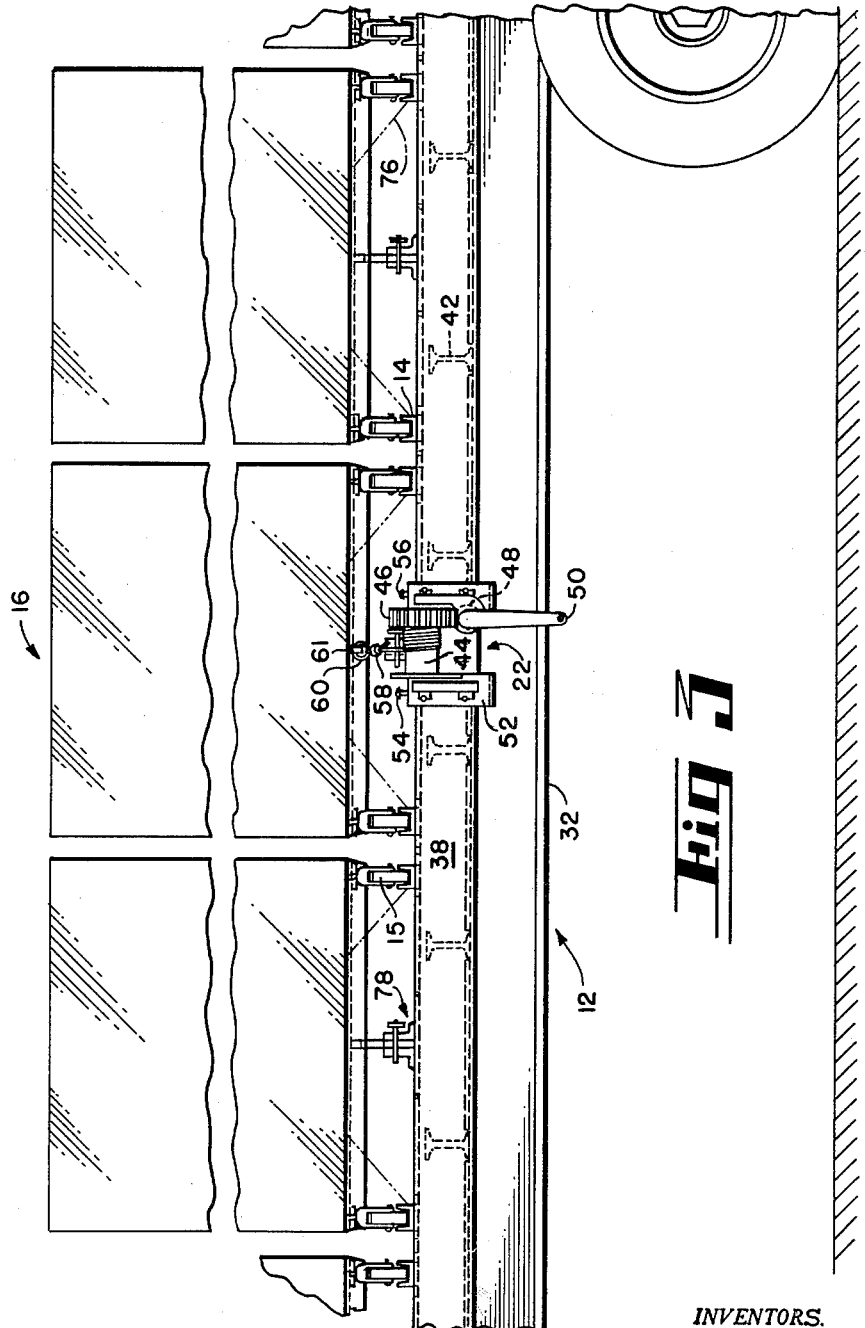

Feb. 9, 1965 C. N. CHANDLER ETAL 3,168,959
CARGO TRANSPORTING SYSTEM
Filed Sept. 26, 1962 5 Sheets-Sheet 4
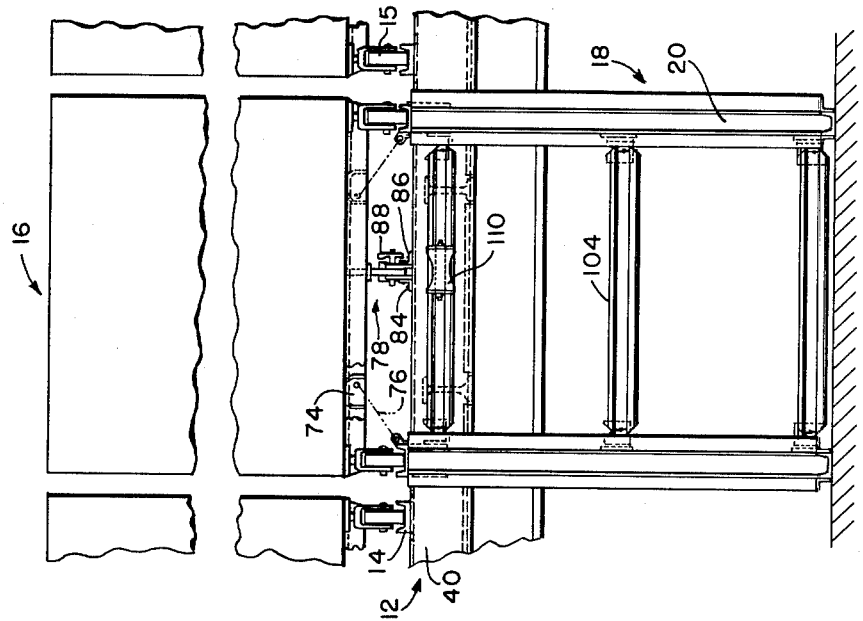
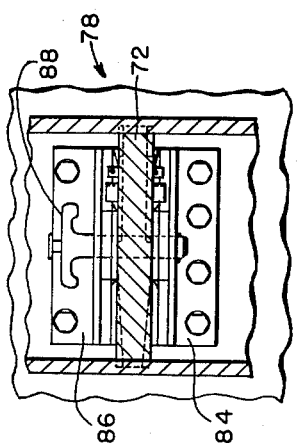
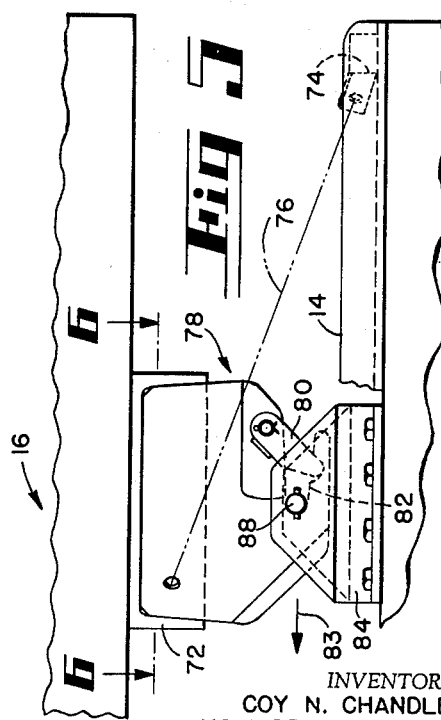
INVENTORS.
COY N. CHANDLER
HOWARD W. BRYAN, JR.
RAY T. ROACH
BY
Alden D. Redfield
Irwin P. Garfinkle
ATTORNEYS.

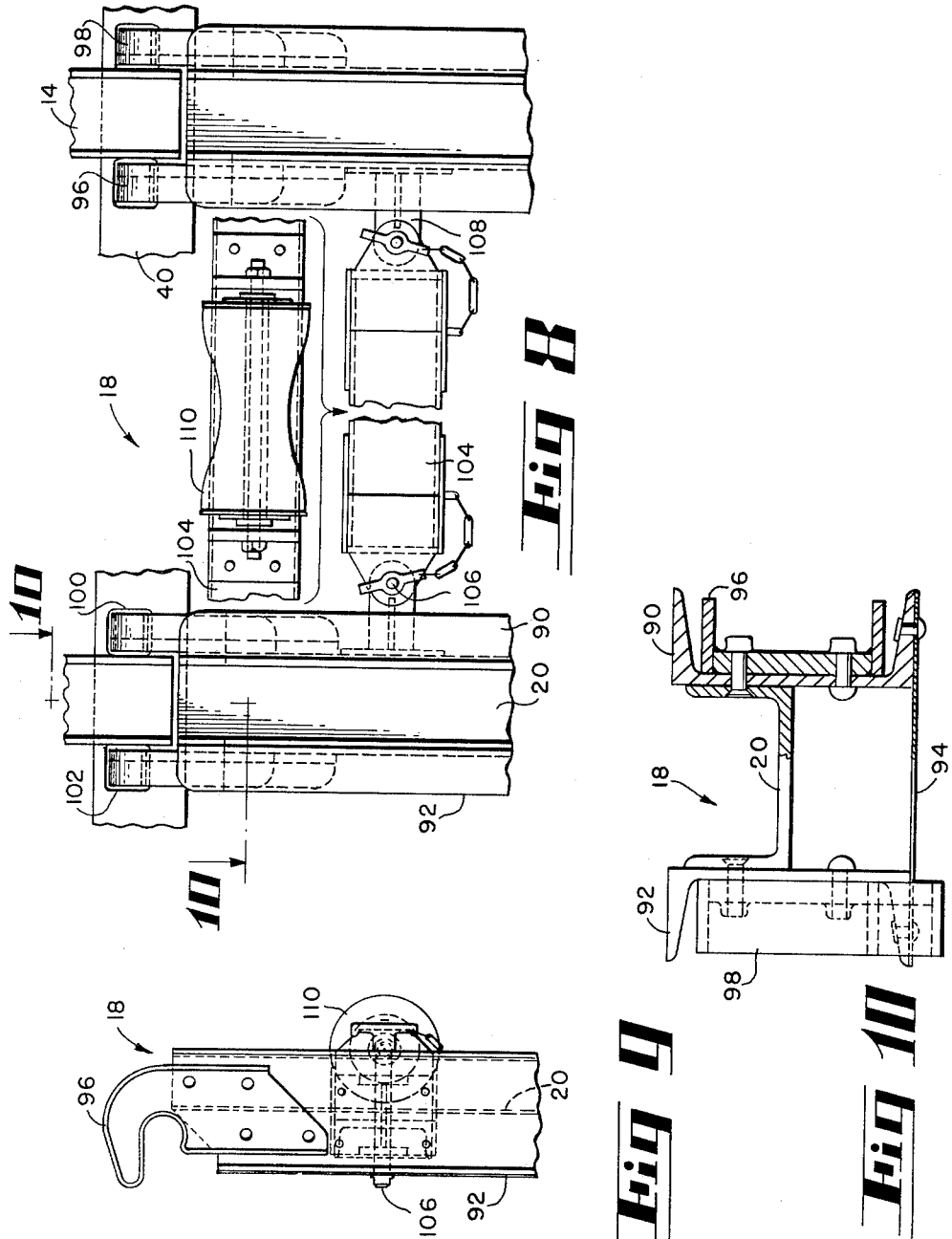

United States Patent Office 3,168,959
Patented Feb. 9, 1965

3,168,959
CARGO TRANSPORTING SYSTEM
Coy N. Chandler, Howard W. Bryan, Jr., and Ray T. Roach, Nashville, Tenn., assignors to Avco Corporation, Nashville, Tenn., a corporation of Delaware
Filed Sept. 26, 1962, Ser. No. 226,231
3 Claims. (Cl. 214—517)

This invention relates to cargo-carrying vehicles, and particularly to flat-bed type carriers having transverse pairs of rails for enabling selective loading and unloading.

In certain types of operations, for example in supplying remote locations in a chain of stores, restaurants, or the like from a distribution center such as a warehouse or commissary, it has been customary that the supplies be bulk-loaded onto a carrier at the distribution center and thereafter hauled to the various remote locations. For unloading, the driver is generally assisted by employees at the location who remove the supplies designated for them from the truck onto a loading dock. This system, of course, requires that the remote location be prepared for the delivery, especially if perishables are involved, and that sufficient assistance be available for unloading. Also, care must be taken in loading the carrier such that the first supplies to be unloaded, be loaded into positions closest to the doors of the carrier.

The present invention seeks to overcome the disadvantages of prior-art systems by constructing a flat-bed type carrier, in combination with separable cargo containers, such that the driver may easily load and unload the containers without assistance, and such that the containers may be safely left at the distribution points without the presence of a local employee.

Briefly described, this invention incorporates a semitrailer flat-bed carrier on which are secured a plurality of pairs of parallel transverse tracks. A wheeled cargo container for carrying the supplies of only one remote location is rolled onto each pair of tracks on the flat-bed. The containers are heat and cold insulated and are provided with a lockable door. Each container is as long as the trailer bed is wide and is secured from the bottom at its four corners to the trailer flat-bed, thus making full load utilization of the width for road vehicles permitted by law. For ease of loading, a relatively long portable ramp is carried under the trailer bed and is designed for mounting in registry with any selected pair of tracks on either side of the trailer bed. A portable winch, also carried under the trailer bed, is designed for mounting opposite the ramp. Thus a single operator using the winch is able to roll the container up the ramp and onto the flat-bed. In addition, when the container is being loaded or unloaded, the system incorporates safety features which permit movement of the container in only one direction down the ramp under the restraint of the portable winch. The container may nevertheless be loaded onto the flat-bed from either side. The winch may be motorized or manual.

The primary object of this invention is to provide a cargo carrier having provision for carrying a plurality of cargo containers, any one of which may be removed from or loaded onto the trailer without movement of any other container and without the requirement of a loading dock or special material-handling equipment at the point of loading or unloading.

Another object of this invention is to provide a cargo-carrying vehicle comprising a flat-bed carrier having a plurality of pairs of transverse tracks for carrying a plurality of wheeled cargo containers, said carrier including means for rigidly securing the cargo containers to the carrier, the width of said trailer flat-bed being no greater than the length of any of said cargo containers.

Another object of this invention is to provide a cargo-transporting system in which the cargo is contained in a plurality of cargo containers, each of which is mounted on a pair of transverse tracks on a trailer bed, each cargo container being rigidly secured from the bottom at its corners to the bed, the length of each container being at least as great as the transverse dimension of said trailer bed.

Still another object of this invention is to provide a cargo-carrying system including a flat-bed carrier with a plurality of transverse tracks and on which cargo is contained in a plurality of cargo containers, each cargo container being mounted on a pair of tracks, said flat-bed carrier also carrying a portable ramp having a pair of tracks which are registerable with any selected pair of tracks on the flat-bed carrier, and also carrying a portable winch mountable opposite said ramp for facilitating the loading and unloading of said cargo containers.

Still another object of this invention is to provide a cargo carrier with containers of the type described in which means are provided for preventing transverse movement of the containers except in a desired direction, while permitting selective transverse movement in either direction.

For other objects and for a clearer understanding of the precise nature of this invention, reference should now be made to the following detailed specification and to the accompanying drawings in which:

FIGURE 1 is a perspective representation of the invention showing a plurality of containers mounted on the flat-bed of a semitrailer carrier with one of the containers on the portable ramp;

FIGURE 2 is an end view of the invention showing a cargo container on the tracks of the flat-bed carrier and the general arrangement of the portable winch and ramp;

FIGURE 3 is a side elevational view of the invention showing the portable winch in an operational position;

FIGURE 4 is a side elevational view showing the relative position of the ramp with respect to a container;

FIGURE 5 illustrates the pin-pawl mechanism for permitting movement of each container in only the desired direction on the tracks;

FIGURE 6 is a sectional view taken through the line 6—6 in FIGURE 5;

FIGURE 7 is a view showing a tie-down mechanism used for securing each of the containers to the flat-bed;

FIGURE 8 is a view showing details of the ramp used in accordance with this invention;

FIGURE 9 is a side view of the upper portion of the ramp; and

FIGURE 10 is a view taken through the line 10—10 in FIGURE 8.

Referring first to FIGURE 1, there is shown a conventional tractor 10 for hauling a semitrailer flat-bed 12. The semitrailer flat-bed 12 has a plurality of pairs of tracks 14 in which the wheels 15 of a plurality of cargo containers 16 are supported. Preferably, the wheels 15 are swiveled, and one is appropriately mounted at each corner of the bottom of the containers 16. A ramp 18 provided with parallel tracks 20 is normally carried under the trailer bed during hauling operations, but for loading and unloading is mounted with its tracks 20 in registry with any selected pair of tracks 14 on the trailer bed. The ramp 18 is made of a length approximately twice the length of the containers 16, so that the angle between the ramp and the plane of the flat-bed is relatively small, so as to permit the wheels of the container to pass uninhibited over the junction of the ramp and the bed. The ramp may be stored in knock-down or assembled condition under the trailer bed. A winch 22, mountable on the opposite side of the trailer bed (FIGURE 2) by appropriate means, facilitates the loading or unloading of the container.

Each cargo container 16 is preferably of double-walled construction, having an inner wall 23 and an outer wall 24, between which is provided a foamed-in-place polyurethane plastic insulator 26. Each container has a door 28 provided with suitable locking means 30. Thus, the containers may be left unattended at the remote locations even when perishables are carried.

When used for hauling frozen foods, the temperature of the cargo and the container is reduced to a degree sufficient to maintain a freezing temperature during the entire transit time plus any additional time that the container may remain unopened at the remote location. Various methods may be used for reducing cargo temperature and, if desired, mechanical refrigeration may be included in the container. Means may also be provided for injecting expandable liquids or gases, such as nitrogen, into the container at prescribed intervals.

The flat-bed 12 may be made by means of any conventional construction techniques. As illustrated in FIGURES 2 and 3, it includes two main central supporting I-beams 32 and 34 from which the rear wheel assembly, generally indicated at 36, is supported, two side beams 38 and 40 and a plurality of transverse I-beams 42, all of which are appropriately welded or otherwise secured into an appropriate rectangular frame or flat-bed 12. The parallel tracks 14 extend transversely across the flat-bed 12 and are secured by any appropriate means to the side beams 38 and 40.

As best seen in FIGURE 3, the winch 22 is illustrated as comprising a reel 44 driven by a large diameter gear 46, which in turn is rotated by a hand-driven gear 48 by means of a handle 50. The entire winch 22 is supported from a bracket 52 which is clamped onto one of the side beams 38 or 40 by means of pins 54 and 56 which extend through the bracket 52 and into corresponding holes in the side beams. The winch is provided with an appropriate cable 58, one end of which is secured to the reel 44 and the other end of which is provided with a hook 60 adapted to be connected to an eye 61 on each cargo container.

As best seen in FIGURE 5, each of the cargo containers 16 is provided with a structural supporting beam 72 adjacent but spaced from each end of the container. For tying down the four corners of the container, a bracket 74 is mounted on the side beams 38 and 40 adjacent the ends of each track, and a tie-down mechanism 76, schematically represented in FIGURE 5, is coupled between the ends of the supporting beams 72 and the brackets 74. A suitable mechanism 76 for tying down the containers 16 to the flat-bed 12 is shown in FIGURE 7, but since the particular mechanism used forms no part of this invention, it is not described in detail.

Pawl mechanisms 78 and 79 (illustrated in outline in FIGURE 2) are mounted on the bottom of each of the supporting beams 72 at the center thereof. It will be understood that both mechanisms are identical but oppositely disposed, and therefore only the mechanism 78 (FIGURE 5) is described and illustrated in detail. The pawl mechanism 78 includes a pawl 80 which is permitted by the contour of the mechanism to rotate to a limited degree in the direction towards a pin-receiving slot 82. The pawl mechanism cooperates with two brackets 84 and 86 mounted on the flat-bed 12 with a space therebetween, the pawl mechanism registering with and capable of passing through the space. The brackets 84 and 86 have aligned holes through which a removable pin 88 extends, and when the container 16 is in its tied-down position, the holes are in registry with the slot 82 of the pawl mechanism 78. When the pin 88 is in position in the brackets 84 and 86 and the slot 82, and with the pawl 80 in the position illustrated in FIGURE 5, the container is constrained from movement in either direction. When the pin is removed, the pin and pawl do not constrain the container. When the pawl is rotated clockwise, the container can move in the direction of the arrow 83.

The details of the ramp 18 are best illustrated in FIGURES 8 to 10. Preferably, the ramp is of the type which is readily knocked down for storage and rapidly assembled for use in loading or unloading. The ramp 18 comprises two identical supports for the tracks 20, each of which is fabricated of two channel-shaped members 90 and 92 to which the tracks 20 are riveted along their entire length. Additional rigidity is provided by a member 94 which serves to make a box-type frame for the supports. Hook-shaped members 96 and 98 riveted within the channel of the channel-shaped members 90 and 92, respectively, extend beyond the support and are insertable in appropriately spaced slots 100 and 102 in the side beams 38 and 40 of the flat-bed to position the tracks 20 in registry with any selected pair of tracks 14. Cross members 104, for appropriately spacing the track supports, are secured at their ends to the supports by means of removable pins 106 which are positioned through appropriate brackets 108. The first of the cross members 104 is provided with a rotatable pulley 110 over which the winch cable 58 passes.

In a loading operation of the cargo-handling system illustrated, the operator secures the ramp 18 in registry with the tracks 14 onto which it is desired to load a container 16, and the portable winch 22 is secured on the opposite side of the flat-bed. The cable 58 is secured by means of the hook 60 and the eye 61 on a container 16. The operator then removes the pin 88 from the brackets 84 and 86 on the side of the flat-bed adjacent the ramp 18, leaving the pin 88 in position on the side adjacent the winch. The operator then cranks the winch by means of the handle 50, drawing the container up the tracks 20 and 14. As the container rides onto the tracks 14, the entire pawl mechanism 78 rides through the space between the brackets 84 and 86 on the ramp side of the flat-bed, but is engaged by the pin 88 on the winch side of the flat-bed, the pawl 80 being automatically rotated out of the way until the pin 88 and slot 82 are in registry. Thereafter the pawl 80 falls into a locking position. The operator then inserts the other pin 88 on the ramp side, thus preventing further movement of the cargo container in either transverse direction. The operator then ties down the four corners of the container 16 with the tie-down mechanism 76 illustrated in FIGURE 7, or any other suitable mechanism.

For unloading, the operator unclamps the tie-down mechanisms 76 at each corner and pulls the pin 88 from the ramp side of the flat bed. When he is ready to lower the container by means of the winch 22, he manually rotates the pawl 80 out of position, permitting the container to roll towards the ramp side.

It will be noted that in the loading operation the pin 88 on the winch side of the flat-bed prevents the cargo from overriding, and that in the unloading operation, the same pin prevents the container from rolling in the wrong direction, permitting motion only towards the ramp. Furthermore, with the tie-down mechanism from the flat-bed to the bottom of the containers, the containers are rigidly secured to the flat-bed without the requirement of side walls for the bed. This feature permits maximum utilization of the trailer and also permits the maximum size container. With the arrangement described, the aggregate dimensions of the cargo containers may equal an equivalent conventional trailer body since no additional side walls are required for securing the cargo. Since the trailer has no side walls, individual cargoes are selectively removable from the trailer without disturbing any other part of the trailer load. In any normal operation between a distribution center and a remote location to be supplied, the trailer may deliver loaded containers at the remote locations, and pick up empty containers previously delivered, thereby insuring maximum utilization of the equipment.

It is apparent that this invention is susceptible of many modifications and adaptations. For example, while a manual winch has been shown, a motorized, portable winch is also contemplated and would, in fact, be preferable. Also, the particular tie-down mechanism illustrated at 76 is a matter of choice, other known mechanisms being equally suitable. Moreover, it is entirely within the spirit of this invention that two half-size containers may be secured to each of the tracks, although under those circumstances any given container could be unloaded from only one side.

From the foregoing it may be seen that what has been produced by this invention is a system having many features and advantages. The tie-down features in combination with the pin and pawl arrangements on each side of the container produce a container which eliminates the need for a conventional trailer body and requires no other body portions to maintain the container rigidly secured to the flat-bed. At the same time the pin and pawl arrangement provides complete safety to the operator in a loading and unloading operation. Transverse tracks in combination with a portable winch and a portable ramp permit the selective loading and unloading of maximum size cargo containers without requiring docks or special material-handling apparatus at remote locations.

Having thus described one preferred embodiment of this invention, what is claimed is:

1. In a cargo transporting system, the combination comprising:
   a cargo carrier having a rectangular flat-bed, said flat-bed having a plurality of pairs of transverse tracks;
   a plurality of cargo containers, the length of said cargo containers being substantially equal to the width of said rectangular flat-bed, each of said containers having a wheel at each of its corners, said wheels of said containers being supported in a respective one of said pairs of tracks;
   means for releasably rigidly securing each of said cargo containers entirely from the bottom thereof to said flat-bed internally of the outer periphery of said cargo containers;
   means for selectively loading and unloading any one of said containers from the side of said flat-bed; and
   additional means for preventing transverse motion of said containers when unsecured for unloading, said additional means comprising a pair of oppositely disposed pawl mechanisms mounted on opposite ends of said containers, and a pair of pins removably supported on said flat-bed for engagement with each of said pawls, respectively.

2. The invention as defined in claim 1 wherein said means for selectively loading and unloading said containers comprises a portable ramp mounted from the side of said flat-bed adjacent any selected one of said containers, said ramp having a pair of tracks registerable with the selected pair of tracks on said flat-bed and wherein is provided a portable winch having a cable connected to said one selected container mountable on the other side of said flat-bed opposite said ramp.

3. In a cargo transporting system, the combination comprising:
   a cargo carrier having a rectangular flat-bed;
   a plurality of rectangular wheeled cargo containers, the length of said cargo containers being substantially equal to the width of said rectangular flat-bed;
   a pair of parallel tracks for supporting the wheels of each of said plurality of cargo containers, said pairs of tracks being mounted on said flat-bed and extending substantially entirely across the width thereof;
   means for releasably rigidly securing each of said cargo containers from the bottom thereof to said flat-bed on a pair of tracks;
   a portable ramp, said portable ramp having a length equal to approximately twice the width of said carrier, said ramp having a pair of tracks extending the entire length thereof;
   means for securing one end of said ramp to said flat-bed with the tracks of said ramp in registry with any selected pair of tracks on said flat-bed;
   a portable winch;
   means for mounting said winch on said flat-bed on the side opposite said ramp, said winch having a cable attachable to said cargo container;
   a pair of oppositely disposed pawl mechanisms mounted on opposite ends of said containers; and
   a pair of pins removably supported on said flat-bed for engagement with each of said pawls, respectively.

References Cited by the Examiner
UNITED STATES PATENTS

| | | | |
|---|---|---|---|
| 1,673,740 | 6/28 | Eide | 214—85 X |
| 1,830,740 | 11/31 | Leech et al. | 214—38.20 X |
| 1,883,538 | 10/32 | Bywater | 214—516 |
| 1,921,605 | 8/33 | Canfield | 214—85 X |
| 2,144,410 | 1/39 | Ludington | 214—516 X |
| 2,150,371 | 3/39 | Furnish | 214—38 |
| 2,188,374 | 1/40 | Sanchez | 214—85.1 |
| 2,346,605 | 4/44 | Proudfoot | 214—85.1 |
| 3,095,989 | 7/63 | Morrison | 214—85 |

HUGO O. SCHULZ, *Primary Examiner.*

GERALD M. FORLENZA, *Examiner.*